United States Patent
Kapoor et al.

(10) Patent No.: US 9,351,157 B2
(45) Date of Patent: May 24, 2016

(54) METHODS, SYSTEMS, AND DEVICES TO REDUCE AUDIO TRUNCATION DURING TRANSCODING

(71) Applicant: MOTOROLA SOLUTIONS, INC, Schaumburg, IL (US)

(72) Inventors: Anuj Kapoor, Palatine, IL (US); Daniel J. McDonald, Cary, IL (US); Harish Natarahjan, Streamwood, IL (US); Yunhai Yang, Elgin, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 212 days.

(21) Appl. No.: 14/056,719

(22) Filed: Oct. 17, 2013

(65) Prior Publication Data

US 2015/0110272 A1    Apr. 23, 2015

(51) Int. Cl.
*H04W 12/02*    (2009.01)
*H04K 1/00*    (2006.01)
*H04L 9/14*    (2006.01)
*H04W 88/18*    (2009.01)

(52) U.S. Cl.
CPC .......... *H04W 12/02* (2013.01); *H04K 1/00* (2013.01); *H04L 9/14* (2013.01); *H04W 88/181* (2013.01)

(58) Field of Classification Search
CPC ........................ H04W 12/02; H04L 63/0428
See application file for complete search history.

(56) References Cited

U.S. PATENT DOCUMENTS

| 5,185,797 | A | * | 2/1993 | Barrett | H04K 1/00 380/273 |
| 5,305,384 | A | * | 4/1994 | Ashby | H04K 1/02 380/28 |
| 5,594,869 | A | * | 1/1997 | Hawe | H04L 29/06 370/474 |
| 6,097,817 | A | * | 8/2000 | Bilgic et al. | 380/270 |
| 6,571,212 | B1 | * | 5/2003 | Dent | 704/270.1 |
| 7,362,780 | B2 | * | 4/2008 | Liu | H04L 63/045 370/521 |
| 7,463,901 | B2 | | 12/2008 | Svedberg | |
| 7,505,590 | B1 | | 3/2009 | Apostolopoulos | |
| 7,747,017 | B2 | | 6/2010 | Valentine et al. | |
| 8,169,983 | B2 | | 5/2012 | Janky | |

(Continued)

FOREIGN PATENT DOCUMENTS

EP    1417834 B1    7/2011
WO    2005081533 A1    9/2005

OTHER PUBLICATIONS

Australian Patent Examination Report No. 1 Dated Apr. 22, 2015 for Counterpart Application AU2014250623.

*Primary Examiner* — Jialong He

(57) ABSTRACT

Reduction of audio truncation when transcoding speech data from one coding format to another. Embodiments include receiving packets of a first communication session containing first encrypted speech data encoded according to a vocoder of a first type and encrypted using an encryption protocol, and containing a first encryption protocol identification information distributed among the received packets. Further embodiments include extracting the first encryption protocol identification information from the received packets and processing the received packets based on the first encryption identification information. Embodiments include transmitting one or more voice header packets containing a second encryption protocol identification information in a second communication session as well as transmitting packets in the second communication session containing second encrypted speech data encoded according to a vocoder of a second type.

15 Claims, 6 Drawing Sheets

(56) References Cited

U.S. PATENT DOCUMENTS

| | | |
|---|---|---|
| 8,441,955 B2 | 5/2013 | Wilkinson et al. |
| 2002/0097718 A1* | 7/2002 | Korus et al. .................... 370/390 |
| 2002/0163911 A1* | 11/2002 | Wee et al. ..................... 370/389 |
| 2005/0169175 A1* | 8/2005 | Apostolopoulos ...... H04L 29/06 370/230 |
| 2006/0080094 A1* | 4/2006 | Katayama ........... G10L 21/0364 704/229 |
| 2007/0260552 A1* | 11/2007 | Bennett ........................... 705/59 |
| 2008/0031275 A1* | 2/2008 | Janky et al. .................... 370/466 |
| 2008/0175158 A1* | 7/2008 | Wiatrowski .......... H04L 1/0045 370/242 |
| 2009/0028337 A1* | 1/2009 | Balabine ............. H04L 63/0492 380/277 |
| 2010/0146266 A1* | 6/2010 | Chen ................... H04L 63/0428 713/160 |
| 2010/0261477 A1* | 10/2010 | Duran ..................... H04W 4/10 455/445 |
| 2011/0150219 A1* | 6/2011 | Newberg .................. H04L 9/12 380/255 |
| 2012/0207302 A1* | 8/2012 | Alexander ........... H04W 12/02 380/255 |
| 2013/0142335 A1* | 6/2013 | Senese ................. H04W 12/08 380/270 |

* cited by examiner

METHODS, SYSTEMS, AND DEVICES TO REDUCE AUDIO TRUNCATION DURING TRANSCODING

BACKGROUND OF THE INVENTION

Personal radio communication devices (i.e. subscriber units) use wireless interconnectivity to communicate with each other over one or more different wireless networks. That is, certain subscriber units are coupled to one type of wireless network while others may be coupled to a different type of wireless network. Each wireless network may implement a different multiple access protocol as well as different encoding of voice/speech data. Thus, a transcoder device may be implemented to facilitate communication between a subscriber unit coupled to one type of wireless network to another subscriber coupled to a different type of wireless network. Such a device facilitates communication by transcoding the speech data encoded in one format into another format. Further, the communication between subscriber units may be encrypted using one or more encryption protocols. Consequently, part of the transcoding process would be to decrypt encoded speech data in one format and encrypt encoded speech data in another format.

In some scenarios, significant loss of data and truncation of voice information may occur at the beginning of a transcoding procedure. Accordingly, there is a need for methods, systems, and devices to reduce audio truncation during transcoding.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
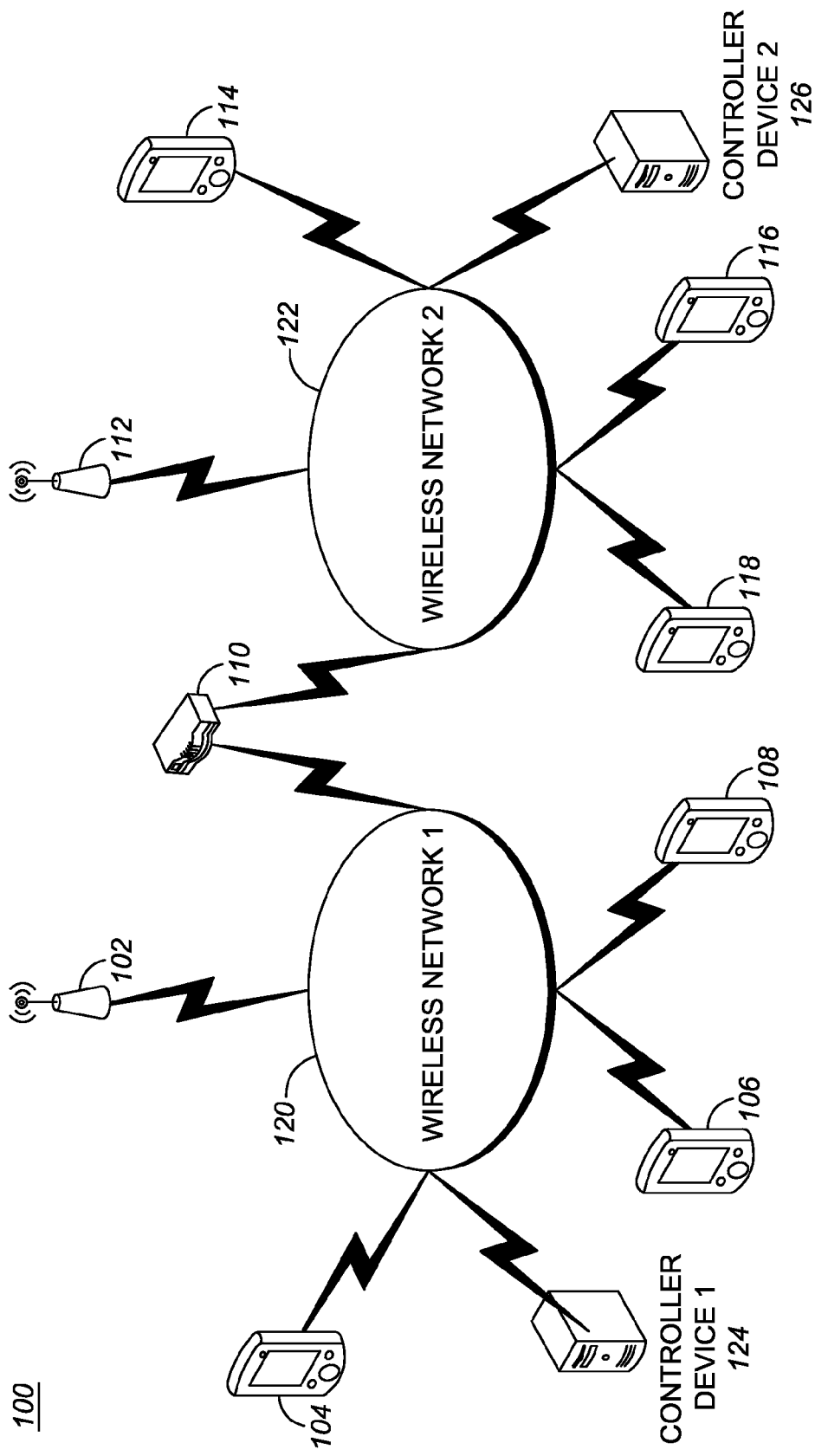
FIG. 1 is a block diagram of a transcoding system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Embodiments of the present disclosure describe methods, systems and devices to reduce audio truncation when transcoding speech data from one coding format to another. Such methods, systems, and devices include receiving packets of a first communication session containing first encrypted speech data encoded according to a vocoder (i.e. voice encoder) of a first type and encrypted using an encryption protocol, and containing a first encryption protocol identification information distributed among a plurality of the received packets. Further, the methods, systems, and devices include extracting the first encryption protocol identification information from the plurality of the received packets and processing the plurality of the received packets based on the first encryption protocol identification information. In addition, the methods, systems, and devices include transcoding first vocoder speech data to second vocoder speech data encoded according to a vocoder of a second type. Moreover, the methods, systems, and devices include transmitting one or more voice header packets containing a second encryption protocol identification information in a second communication session as well as transmitting packets in the second communication session containing second encrypted speech data encoded according to a vocoder of a second type, and including the second encryption protocol identification information distributed among a plurality of the transmitted packets. In some embodiments processing the plurality of received packets includes decrypting encrypted speech data from at least some of the received packets to obtain the first vocoder speech data. Further, the methods, systems, and devices may encrypt the second vocoder speech data according to the second encryption protocol identification information to obtain second encrypted speech data encoded according to the vocoder of a second type.

FIG. 1 is a block diagram of a transcoding system 100 in accordance with some embodiments. The transcoding system 100 may include one or more subscriber units (104, 106, 108) and a radio frequency (RF) site 102 coupled to a wireless network 1 (120). Further, transcoding system 100 may include one or more subscriber units (114, 116, 118) and an RF site 112 coupled to a wireless network 2 (122). In addition, communication between subscriber units (104, 106, 108) coupled to wireless network 1 (120) and subscriber units (114, 116, 118) coupled to wireless network 2 (122) may be routed through a transcoder 110. Moreover, RF site 102 may relay communications between subscriber units (104, 106, 108) and the transcoder 110 and RF site 112 may relay communications between the transcoder 110 and subscriber units (114, 116, 118).

Wireless networks 1 and 2 (120 and 122) may be land mobile radio (LMR) networks. Further, wireless networks 1 and 2 (120 and 122) may each implement a different multiple access protocol and a different vocoder type. A multiple access protocol allows several subscriber units to share a frequency range to communicate among themselves without interfering with one another. Examples of multiple access protocols include frequency division multiple access (FDMA) protocol, which separates the frequency range in smaller frequency ranges called frequency channels such that each of (or subset of) the subscriber units is assigned a frequency channel to transmit data thereon to limit interference. Alternatively, a time division multiple access (TDMA) protocol assigns a time slot for each of (or subset of) the subscriber units to transmit data thereon to limit interference. Other protocols such as code division multiple access (CDMA) could be used as well.

A vocoder is a voice encoder that either encodes speech data into a particular format/coded speech or decodes formatted/encoded speech data into unformatted speech data, such as an analog or digitally sampled time domain signal. Examples of vocoder types include Advanced Multi-Band Excitation Full-Rate (AMBE FR) speech code and Improved Multi-Band Excitation (IMBE) speech code as well as Advanced Multi-Band Excitation Half-Rate (AMBE HR). Such speech codes allow for the passing of control and management information (e.g. encryption information) as well as provide compression to reduce the amount of data that needs to be transmitted in order to convey the speech data.

In one embodiment, wireless network 1 (120) may implement a TDMA protocol and an AMBE HR vocoder type (i.e. speech encoded in AMBE HR format). Alternatively, wireless network 2 (122) may implement an FDMA protocol and an IMBE vocoder type (i.e. speech encoded in IMBE format). (Note, AMBE FR may also be implemented in wireless networks using FDMA; thus, the systems, methods, devices in this disclosure that encode speech data in an IMBE format may also encode data in an AMBE FR format). Further, a source subscriber unit 104 may communicate to a group of subscribers (106, 108, 114, 116, 118) at the same time (e.g. talk group). However, some subscriber units (104, 106, 108) in the talk group are coupled to the same wireless network 1 (120) while the other subscriber units (114, 116, 118) are coupled to a different wireless network 2 (122). Moreover, the encoded speech data sent from the source subscriber unit 104 may be encrypted. For example, such an embodiment may be used in a public safety situation such that some subscriber units (104, 106, 108) may be used by law enforcement personnel while the other subscriber units (114, 116, 118) may be used by emergency medical personnel. Another example may be that two geographically separated RF sites may each implement different multiple access protocols and/or speech codes such that transcoding is needed to communicate between the two RF sites.

In some embodiments, the transcoder 110 may receive a late entry call. That is, the transcoder 110 may receive voice data from an RF site without any header due to imperfect RF conditions. For example, the imperfect RF conditions of the wireless channel may be caused by interference, distortion, or noise such the header is not received by the transcoder 110, but subsequent encoded speech data is. In other embodiments, a communication session may allow a latecomer to join the communication session after the session has already been established between other participants. In such a scenario, a header of the encoded speech data that contains encryption protocol (identification) information will have already been transmitted between the initial participants and thus will not be available to the latecomer participant, which negatively affects the latecomer's ability to quickly join the communication session.

In scenarios in which the transcoder 110 is not configured with the methods and devices described herein, the transcoder 110 may not receive encryption protocol identification information (e.g. in a subsequent header or subsequent data packets) for a significant amount of time (e.g. 360 ms). Only after receiving such encryption protocol identification information can the transcoder 110 decrypt the encrypted encoded speech data, transcode the speech data from one format to another, and then encrypt the transcoded speech data. Thereafter, the transcoder 110 may then transmit the encrypted transcoded speech data to the destination RF site 112 to be forwarded to a downstream destination subscriber unit (114, 116, 118). However, in such a scenario, the destination RF site 112 and downstream destination subscriber unit (114, 116, 118) also has not received the header packet(s) containing the encryption protocol identification information needed to decrypt the transcoded speech data nor has transcoder 110 inserted voice header packets containing the encryption protocol identification information. Not until the intended receiver (subscriber unit) extracts the embedded encryption protocol information a significant time later (e.g. up to 720 ms from the beginning of the communication session) may the intended receiver then decrypt the transcoded speech data. The ramifications of receiving the subsequent encryption protocol identification information after such a significant time (e.g. 720 ms) include the voice data or audio being truncated at a beginning of the call at a downstream destination subscriber unit (114, 116, 118) resulting in data loss.

However, in embodiments of the present disclosure, the transcoder 110 receives the encryption protocol identification information that is interspersed throughout the encoded speech data. In such embodiments, the transcoder 110 may receive all of the encryption protocol identification information within a period of time (e.g. 360 ms). After receiving the encryption protocol identification information, the transcoder 110 decrypts the encoded speech data and transcodes the speech data from one format to another. Further, the transcoder 110 generates voice header packets that include the encryption protocol identification information needed by the receiving RF site or subscriber units to decrypt the transcoded speech data. Moreover, such embodiments may truncate audio at the beginning of a voice call by only 360 ms or less thereby reducing the truncation of the audio for such a transcoded communication session significantly (e.g. by 360 ms) when compared to transcoder implementations that are not configured with the methods and devices described herein (which may truncate up to 720 ms of audio).

Further, in such embodiments, the transcoder 110 may receive packets of a first communication session sent by a subscriber unit 104 through the RF site 102. The received packets may contain encrypted speech data encoded in AMBE HR format and encrypted using an encryption protocol. Further, the received packets may contain encryption protocol identification information distributed among the received packets. In addition, the transcoder 110 extracts the encryption protocol identification information from the plurality of the received packets and processes the received packets based on first encryption protocol identification information. The encryption protocol may be a standard encryption protocol used in conjunction with the AMBE HR encoded speech data or any other encryption protocol known in the art (e.g. Data Encryption Standard (DES), RSA, etc.).

Moreover, the transcoder device 110 transcodes speech data encoded in AMBE HR format to speech data encoded in IMBE format. Thereafter, the transcoder 110 generates and transmits one or more voice header packets containing encryption protocol identification information according to the IMBE format in a second communication session. Such voice header packets are transmitted to the subscriber units (114, 116, 118) coupled to wireless network 2 (122) through the RF site 112. Further, the transcoder 110 transmits packets in the second communication session containing encrypted speech data encoded in IMBE format including the encryption protocol identification information distributed among the transmitted packets that is used in the IMBE encoding. Again, the encryption protocol may be a standard encryption protocol used in conjunction with the IMBE encoded speech data or any other encryption protocol known in the art (e.g. Data Encryption Standard (DES), RSA, etc.).

In further embodiments, processing the received packets by the transcoder 110 includes decrypting encrypted speech data from at least some of the received packets to obtain the speech data encoded in AMBE HR format. Upon decrypting the encrypted speech, the transcoder 110 transcodes the speech data from AMBE HR format to IMBE format as well as encrypts the speech data based on encryption protocol (identification) information pertaining to the IMBE format to obtain encrypted speech data encoded in IMBE format.

In additional embodiments, the systems, devices, and methods to transcode encoded speech data from one format to another may include receiving a message from a controller device (124, 126) indicating that the received packets are capable of being encrypted. A controller device (124, 126) may be, for example, a zone controller having a centralized architecture or an RF site controller having a distributed architecture that is wirelessly or wiredly coupled to the transcoder 110. For example, the controller device 124 may provide a message to transcoder 110 that indicates a given channel assignment or channel type is capable of carrying encrypted data. As discussed earlier, without header information, the transcoder 110 is unable to immediately determine whether the encoded speech data from a subscriber unit 104 coupled to wireless network 1 (120) and destined to subscriber units (114, 116, 118) coupled to wireless network 2 (122) is encrypted or is not encrypted. In both such embodiments, the transcoder 110 receives and processes the incoming encoded speech data to determine whether the data is encrypted. The determination may be done by examining an algorithm identifier that is part of the encryption protocol identification information extracted from the received packets, and the determination may be aided by receipt of the message from the controller device 124. One value of the algorithm identifier may be configured to correspond to non-encrypted data (i.e., the algorithm identifier indicates that there is no encryption algorithm being used).

However, in an alternative embodiment, the transcoder 110 may receive a message from the controller device (124, 126) indicating that the received packets are not encrypted (i.e. clear). In such an embodiment, the transcoder 110 does not encrypt the speech data according to the IMBE format. Further, it does not need to receive all the packets containing encryption protocol information from the subscriber unit 114 or the RF site 102 so that the transcoder 110 can decrypt the encoded speech data in AMBE HR format (because the encoded speech data in AMBE HR format is not encrypted). Instead, the transcoder 110 immediately transcodes or transmits the encoded speech data to destination subscriber unit(s). That is, the transcoder 110 decodes the encoded speech data in AMBE HR format and encodes the speech data in IMBE format then generates and transmits the voice header packets as well as transmits the packets containing the encoded speech data in IMBE format to destination subscriber unit(s).

Other embodiments may include that wireless network 1 (120) implements FDMA and speech data on wireless network 1 (120) is encoded in IMBE format, and wireless network 2 (122) implements TDMA and speech data on wireless network 2 (122) is encoded in AMBE HR format. Thus, the transcoder 110 transcodes speech data encoded in IMBE format using a vocoder of a first type to decode the speech data and then uses a vocoder of a second type to encode the speech data in AMBE HR format.

Further, the transcoder 110 may be a computing device or computer server that includes one or more processors coupled to one or more memory storage devices to implement the reception, decryption, transcoding, encryption and transmission of the packets described when discussing transcoding system 100 in FIG. 1. Such a transcoder 110 may implement functions in modules described herein, parts of which may be stored on computer readable medium in accordance to the embodiments shown and discussed in the pending disclosure.

In addition, the subscriber units (104, 106, 108, 114, 116 118) may be personal radio communication devices used over the wireless network (120, 122). Such subscriber units may be mobile phones, smartphones, or other radio communication or wireless communication personal devices that can be used in voice over wireless applications including public safety communication applications. Thus, such subscriber units (104, 106, 108, 114, 116 118) may include one or more processors coupled to memory storage devices that implement functions in modules describe herein to facilitate communication from the subscriber unit to the other subscriber units and RF sites (102, 112) coupled to the wireless networks (120, 122).

Moreover, the RF sites (102, 112) may include one or more computing devices such as a base station or RF communication infrastructure equipment that facilitates communication among subscriber units (104, 106, 108, 114, 116, 118) as well between subscriber units (104, 106, 108, 114, 116, 118) and the transcoder 110. Such computing devices and equipment include one or more processors coupled to memory storage devices that implement functions in modules described herein to facilitate communication among subscriber units (104, 106, 108, 114, 116, 118) and the transcoder 110.

In addition, the controller devices (124, 126) are RF communication infrastructure equipment that includes one or more processors coupled to memory storage devices that implement functions in modules described herein to facilitate management of communication among the subscriber units (104, 106, 108, 114, 116, 118) and the transcoder 110. In some embodiments the controller device (124 and 126) may be a zone controller having a centralized architecture or an RF site controller having a distributed architecture.

Moreover, the wireless networks (120, 122) may implement an Association of Public Safety Communications Officials (APCO) Project 25 (P25) compliant network or a Digital Mobile Radio (DMR) compliant network, among other possibilities.

Figure 2:
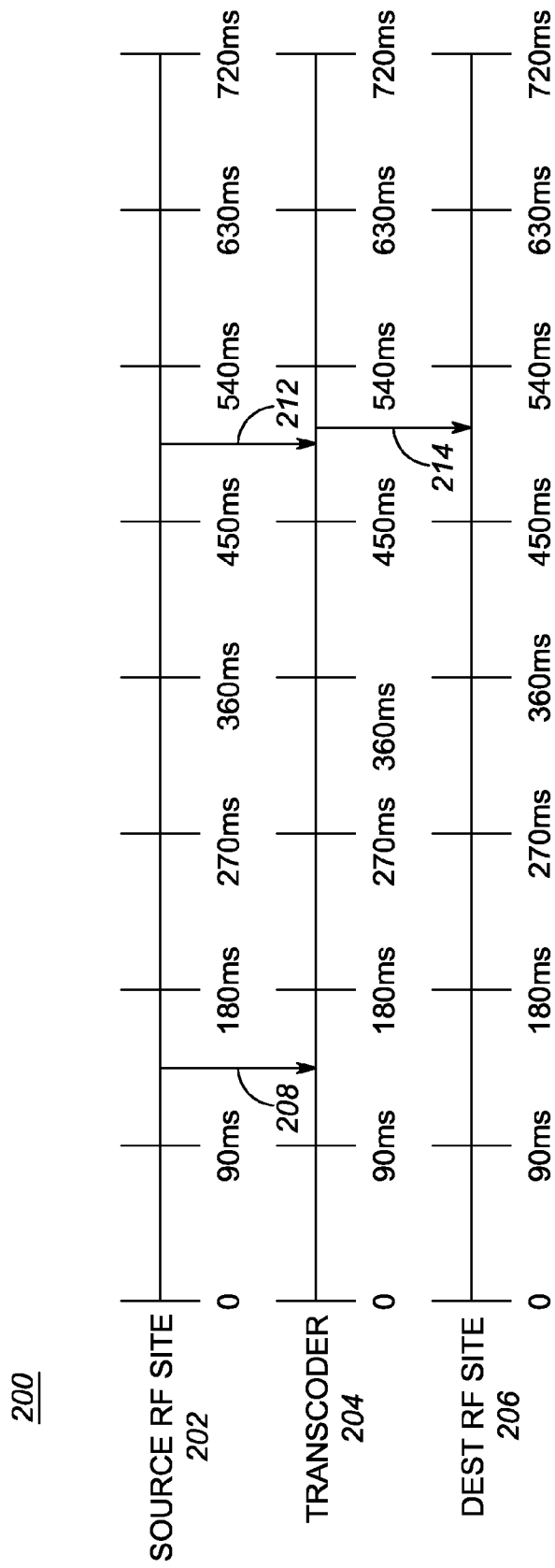
FIG. 2 is a timeline of transcoding data between a source RF site and a destination RF site.

FIG. 2 is a timeline 200 of a method of transcoding. The timeline 200 shows a late entry call that is received from a source RF site 202 at a transcoder 204 at about 135 ms (208). Further, the encoded speech data is encrypted and the transcoder did not receive a header packet containing the encryption protocol identification information to decrypt and transcode the encoded speech data. Thus, in scenarios where the transcoder does not implement the methods and devices described herein, the transcoder 204 may transcode and transmit the encrypted speech to a destination RF site 206. In such scenarios, the transcoder 204 may not receive encryption protocol identification information (e.g. in a subsequent header or subsequent data packets) for a significant amount of time (e.g. 360 ms after receiving the initial data 208—around 495 ms) 212. Only after the receiving such encryption protocol identification information 212 can the transcoder 204 decrypt the encrypted encoded speech data, transcode the speech data from one format to another, and encrypt the transcoded speech data. Thereafter, the transcoder 204 may then transmit the encrypted transcoded speech data 214 to the destination RF site 206 to be forwarded to a downstream destination subscriber unit. The processing, decryption, and encryption of the speech data may take some time. Thus, the transmission of the encrypted transcoded speech data 214 may be sent at around the 515 ms mark. However, in such a scenario, the destination RF site 206 and downstream destination subscriber unit has not received the header packets containing encryption protocol identification information needed to decrypted the transcoded speech data nor has transcoder 204 inserted voice header packets containing the encryption protocol identification information.

Figure 3:
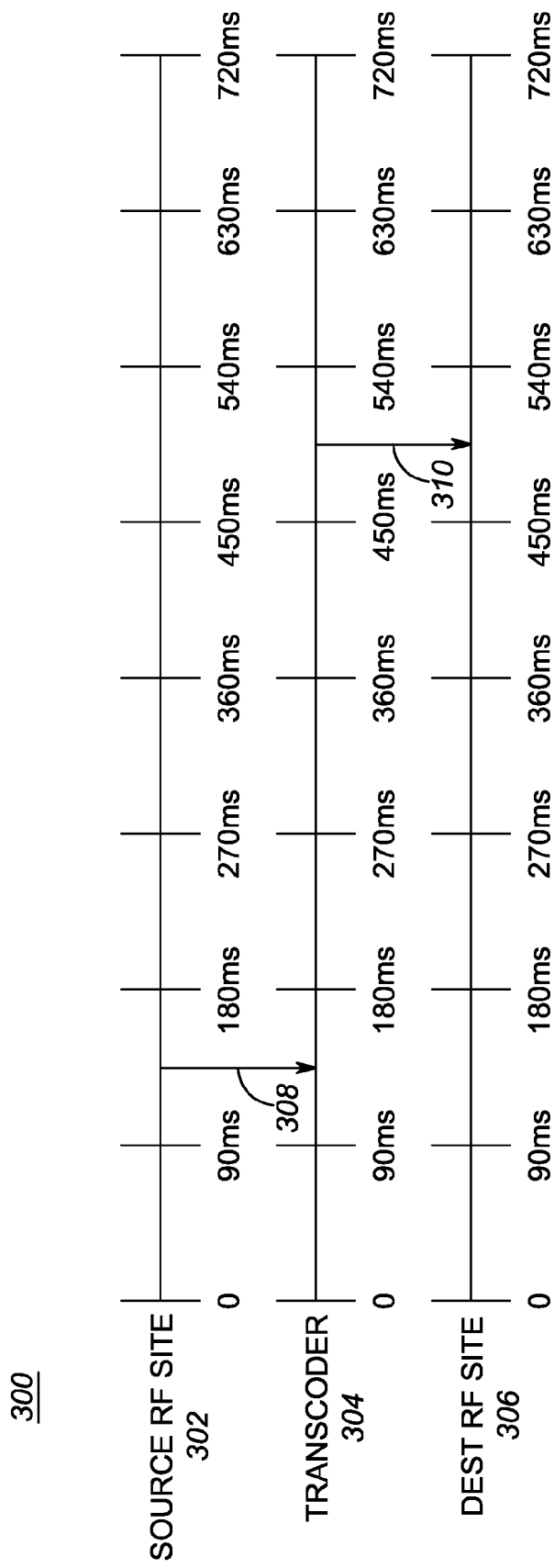
FIG. 3 is a timeline of transcoding data between a source RF site and a destination RF site in accordance with some embodiments.

FIG. 3 is a timeline 300 of a method of transcoding in accordance with some embodiments. The timeline 300, similar to timeline 200, shows a late entry call that is received from a source RF site 302 at a transcoder 304 at about 135 ms (308). Further, the encoded speech data is encrypted and the transcoder did not receive a header packet containing the encryption protocol information to decrypt and transcode the encoded speech data. However, in this embodiment, the transcoder 304 continues to receive packets of encoded speech data. Further, the transcoder 304 can obtain encryption protocol information contained among the received encoded speech data. In such embodiments, the transcoder 304 receives and obtains all the encryption protocol information within 360 ms. Subsequently, the transcoder 304 extracts from the received packets encryption protocol information within 360 ms after receiving the initial data 308 from the source RF site 302. After receiving the encryption protocol information, the transcoder 304 decrypts then transcodes the received encoded speech data. Further, the transcoder 304 generates and transmits voice header packet(s) that include encryption protocol identification information for the transcoded speech data in addition to transmitting transcoded speech data 310 to a destination RF site 306 (and then to one or more downstream destination subscriber units) at approximately the 495 ms mark. Responsive to receiving the voice header packet(s) including the encryption protocol identification information and the transcoded speech data, the destination subscriber units can begin immediately to decrypt the received transcoded speech data. Therefore, the audio received by the destination subscriber units is truncated by only up to 360 ms compared to 720 ms in transcoder implementations that are not configured with methods and devices described herein. Hence, embodiments of the pending disclosure reduce audio truncation for encrypted speech data that needs to be transcoded.

Figure 4:
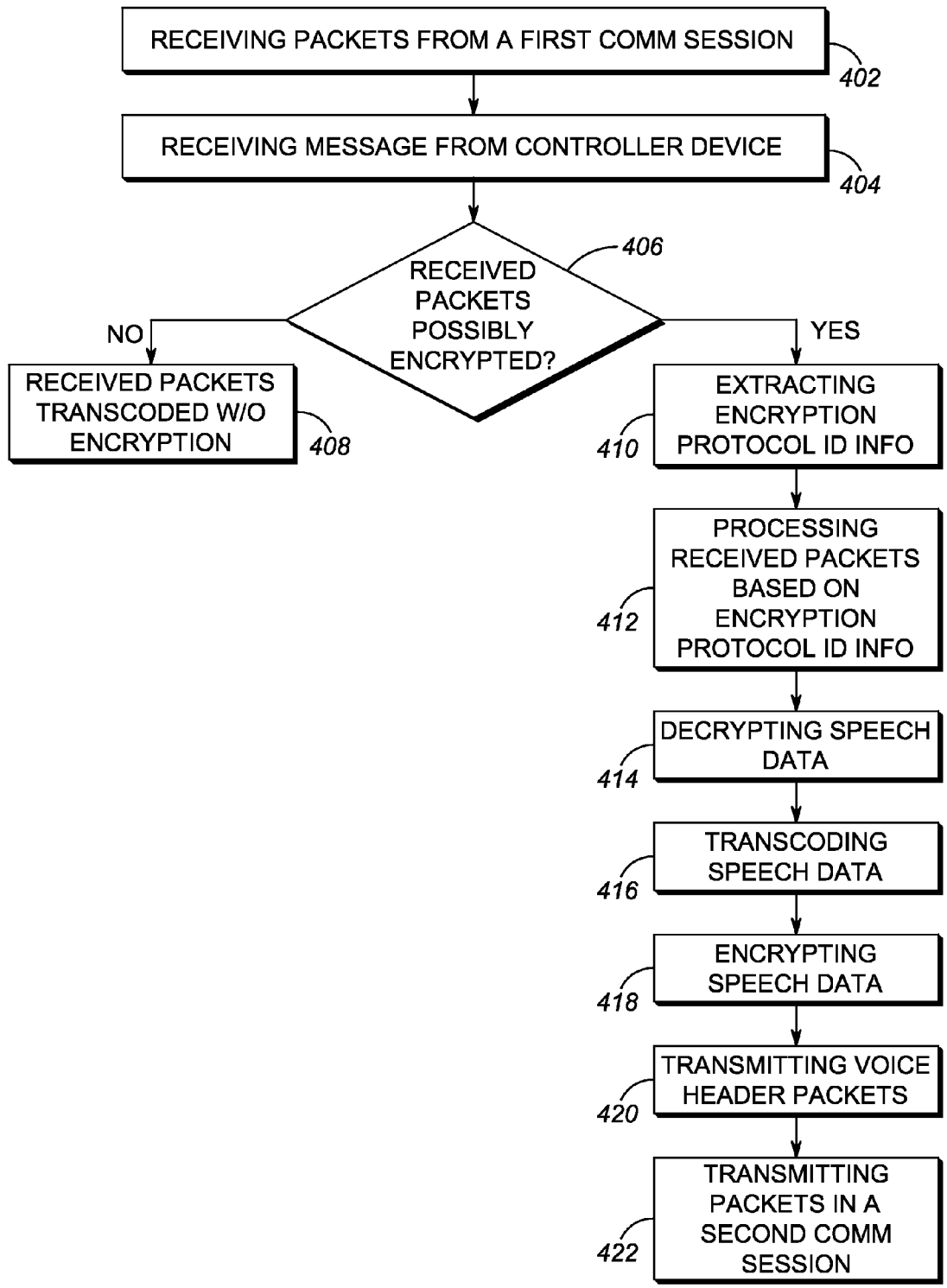
FIG. 4 is a flowchart of a method of transcoding in accordance with some embodiments.

FIG. 4 is a flowchart of a method 400 of transcoding in accordance with some embodiments. The method 400 includes receiving packets, by a transcoder, of a first communication session containing first encrypted speech data encoded according to a vocoder of a first type and encrypted using an encryption protocol, as shown in block 402. The received packets contain a first encryption protocol identification information that may be distributed among one or more received packets. In some embodiments, the method 400 does not include the transcoder receiving encryption information from a controller device, thus bypassing block 404. In some alternative embodiments, however, the method 400 may further include receiving a message, by the transcoder, from a controller device indicating that the received packets are capable of being encrypted, as shown in block 404. (Note, the controller device, in some embodiments, may also provide the source identifier and the talk group identifier). That is, the controller device may indicate by the message whether the received packets are not encrypted, encrypted, or it is not known whether the received packets are encrypted in order to aid the transcoder in transcoding the received speed data. Based on the message, or based on its own determination made without receiving a message from a control device, the transcoder determines whether the received packets are possibly encrypted, as shown in block 406. If the received packets are not encrypted, then the received packets are transcoded immediately by the transcoder without an encryption step, as shown in block 408. That is, the transcoder decodes the encoded speech data in a first format and encodes the speech data in a second format, then generates and transmits the voice header information as well as transmits the packets containing the encoded speech data in the second format. In other embodiments where the received packets are not encrypted, the transcoder may transmit the packets containing the encoded speech data without generating and transmitting a voice header.

However, if the transcoder determines that the received packets are possibly encrypted in block 406, then the method 400 includes extracting, by the transcoder, the first encryption protocol identification information from the received packets, as shown in block 410. In some embodiments, the extracting of the first encryption protocol identification information from the plurality of the received packets is performed when the first communication session is a late-entry communication session. That is, a header packet that includes the first encryption protocol identification information is not among the plurality of received packets (not received due to interference of wireless environment, a participant is late in entering participating in a call, etc.).

In addition, the method includes processing, by the transcoder, the received packets based on the first encryption identification information, as shown in block 412. Also, the method 400 includes decrypting encrypted speech data from at least some of the received packets to obtain the first vocoder speech data, as shown in block 414. In one embodiment, the processing of the received packets may include decrypting the encrypted speech data. The first encryption protocol identification information includes a message indicator, encryption key identifier, and an algorithm identifier and the transcoder decrypts encrypted speech data based on the message indicator, encryption key identifier, and the algorithm identifier.

Moreover, the method 400 includes transcoding first vocoder speech data to second vocoder speech data encoded according to a vocoder of a second type by the transcoder, as shown in block 416. Further, the method 400 includes encrypting, by the transcoder, the second vocoder speech data according to the second encryption protocol information to obtain second encrypted speech data encoded according to the vocoder of a second type, as shown in block 418. In addition, the method 400 includes transmitting, by the transcoder, one or more voice header packets containing the second encryption protocol identification information in a second communication session, as shown in block 420. The voice header packets includes the second encryption protocol identification information pertaining to a second encryption protocol used in conjunction with the format of the second vocoder speech data. The voice header packets may include a message indicator, algorithm identifier, and an encryption key identifier associated with the second encryption protocol. The message indicator is an initialization vector that is used in conjunction with the algorithm identifier and the encryption key identifier. The algorithm identifier indicates the type of encryption algorithm (DES, RSA, etc.) used to encrypt the voice data (or in some embodiments no encryption is used). The key identifier indicates the encryption key used in conjunction with the encryption algorithm. In some embodiments, the voice header packets generated and transmitted by the transcoder may include a source identifier and a talk group identifier sent by the controller device.

In one embodiment, the message indicator, algorithm identifier, and the encryption key identifier may be part of the first encryption protocol identification information extracted from the received packets. In another embodiment, a subset of the message indicator, algorithm identifier, and the encryption key identifier is extracted from the received packets.

In further embodiments, the format of the header packets is based on the format of the encoded speech performed by the vocoder of the second type. In additional embodiments, the second encryption protocol identification information includes a second message indicator different than a first message indicator included in the first encryption protocol identification information, but includes an algorithm identifier and encryption key identifier that was included in the first encryption protocol identification information that was extracted from the received packets (in such embodiments the second message indicator may be received from the controller). Further, the second message indicator is used to decrypt the second vocoder speech data by a destination subscriber unit.

The method 400 includes transmitting packets in the second communication session containing second encrypted speech data encoded according to a vocoder of a second type, and including the second encryption protocol identification information distributed among the transmitted packets, as shown in block 422.

Further, the transcoder may be a computing device or computer server that includes one or more processors coupled to one or more memory storage devices to implement the reception, decryption, transcoding, encryption and transmission of the packets described when discussing the method 400 in FIG. 4. Such a transcoder may implement functions in modules described herein, parts of which may be stored on computer readable medium in accordance to the embodiments shown and discussed in the pending disclosure.

Figure 5:
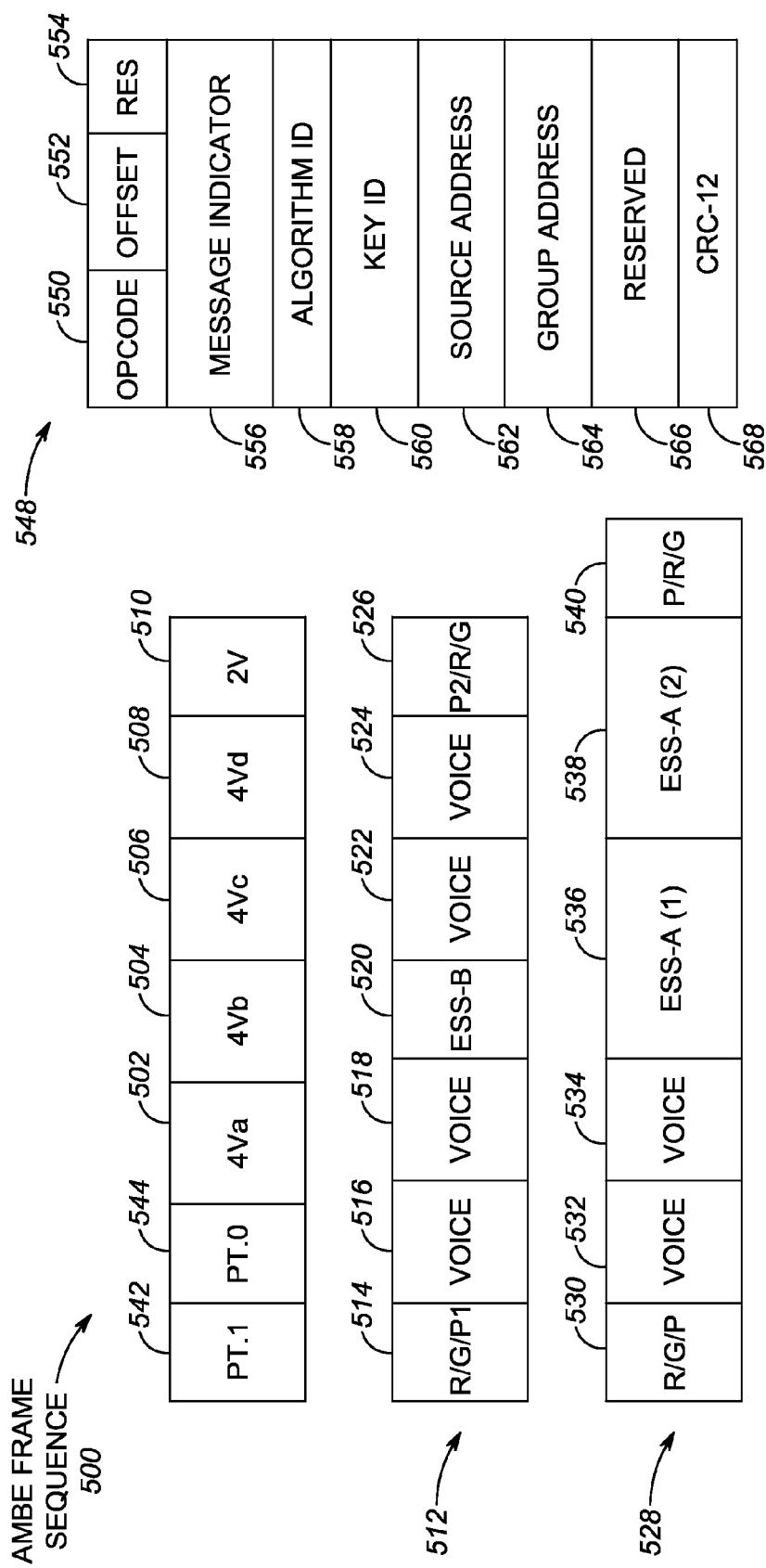
FIGS. 5-6 are block diagrams of speech encoding formats in accordance with some embodiments.

FIG. 5 is a block diagram of an AMBE HR speech encoding format in accordance with some embodiments. Encoding speech data according to an AMBE HR format may be implemented in a TDMA wireless networks. The AMBE HR voice encoding format 500 include a voice frame sequence that includes two headers, labeled PT.1 and PT.0 (542, 544), four 4V burst frames, labeled 4Va, 4Vb, 4Vc, and 4Vd (502, 504, 506, 508) followed by a 2V frame 510. The AMBE HR frame sequence 500 may also be called an AMBE HR superframe 500 and such a superframe has a length of 360 ms.

The two headers, PT.1 and PT.0 (542, 544) include encryption protocol identification information to decrypt encrypted voice data carried in the 4V burst frames and 2V frame. Referring to FIG. 5, a header 548 is shown that includes control and management information as well as the encryption information. The header 548 includes an opcode 550 that is a 3 bit field indicating what type of protocol data unit or frame is being transmitted. Further, the header 548 includes an offset 552 that indicates when the next first 4V burst frame is being transmitted. In addition, the header 548 includes 2-bit reserved field 554. Moreover, the header 548 includes encryption protocol identification information for the voice data such as a message indicator 556, an algorithm identifier, and (encryption) key identifier 560. Further, the header 548 includes source and group (target) addresses (562 and 564) as well a reserved field 566 and a cyclic redundancy code 568.

A transcoder uses the encryption protocol identification information to decrypt the encoded speech data and then transcode and transmit speech data to destination subscriber units. However, if the transcoder is in a late entry scenario, the transcoder may not receive the header 548 in the header packets (542, 544). Thus, the transcoder may have to extract encryption protocol identification information interspersed throughout the 4V and 2V frames and then decrypt the encrypted voice data to transcode the speech data from one voice format to another. In some embodiments, when the transcoder transcodes encryption speech data into AMBE HR format, the transcoder may generate and provide to the receiving RF site or receiving subscriber unit header packets (542, 544) including encryption parameters such as a message indicator, algorithm identifier 558, and key identifier 560. The reception of the header packets (542, 544) allows a receiving RF site or subscriber unit to decrypt the transcoded speech data.

Moreover, the encryption fields are dispersed among the 4V burst and 2V frames. Each AMBE HR superframe includes an Encryption Synchronization Signal (ESS), portions of which are sent throughout the AMBE HR superframe 500. Specifically, the ESS may be separated into two portions, ESS-A and ESS-B and are individually sent throughout the 4V and 2V frames. The ESS includes encryption protocol identification information such as an 8 bit algorithm identifier (ALGID), 16 bit encryption key identifier (KID), and a 72 bit message indicator (MI). Note that the 96 bits of the ESS are Reed Solomon encoded to 264 bits.

Each 4V frame 512 includes two ramp/guard and pilot channels (514, 526) each comprising of 20 bits and four voice frames (516, 518, 522, 524) each comprising 72 bits as well as a ESS-B 520 frame comprising 24 bits. Further, the 2V frame includes two ramp/guard and pilot channels (530, 540) each comprising of 20 bits and two voice frames (532, 534) each comprising 72 bits as well as an ESS-A (1) frame 536 comprising 96 bits and an ESS-A (2) 538 comprising 72 bits. Further, the algorithm identifier, key identifier and message indicator are provided in the ESS-A (1) and ESS-A (2) frames.

When receiving speech data encoded in AMBE HR format, a transcoder decodes the received packets using an AMBE HR vocoder. Further, the transcoder extracts the protocol information from the ESS, where the ESS is transmitted in parts as several ESS-B and ESS-A frames throughout the AMBE HR superframe 500. Alternatively, when transmitting speech data encoded in AMBE HR format, the transcoder provides the necessary encryption protocol identification information in the ESS (as well as in the voice header packets). That is, it provides the information in the ESS-B and ESS-A frames including the algorithm identifier, key identifier, and message indicator.

Encoding and decoding speech data in AMBE HR format can be performed by the transcoder, subscriber units, and RF sites discussed in the pending disclosure.

Figure 6:
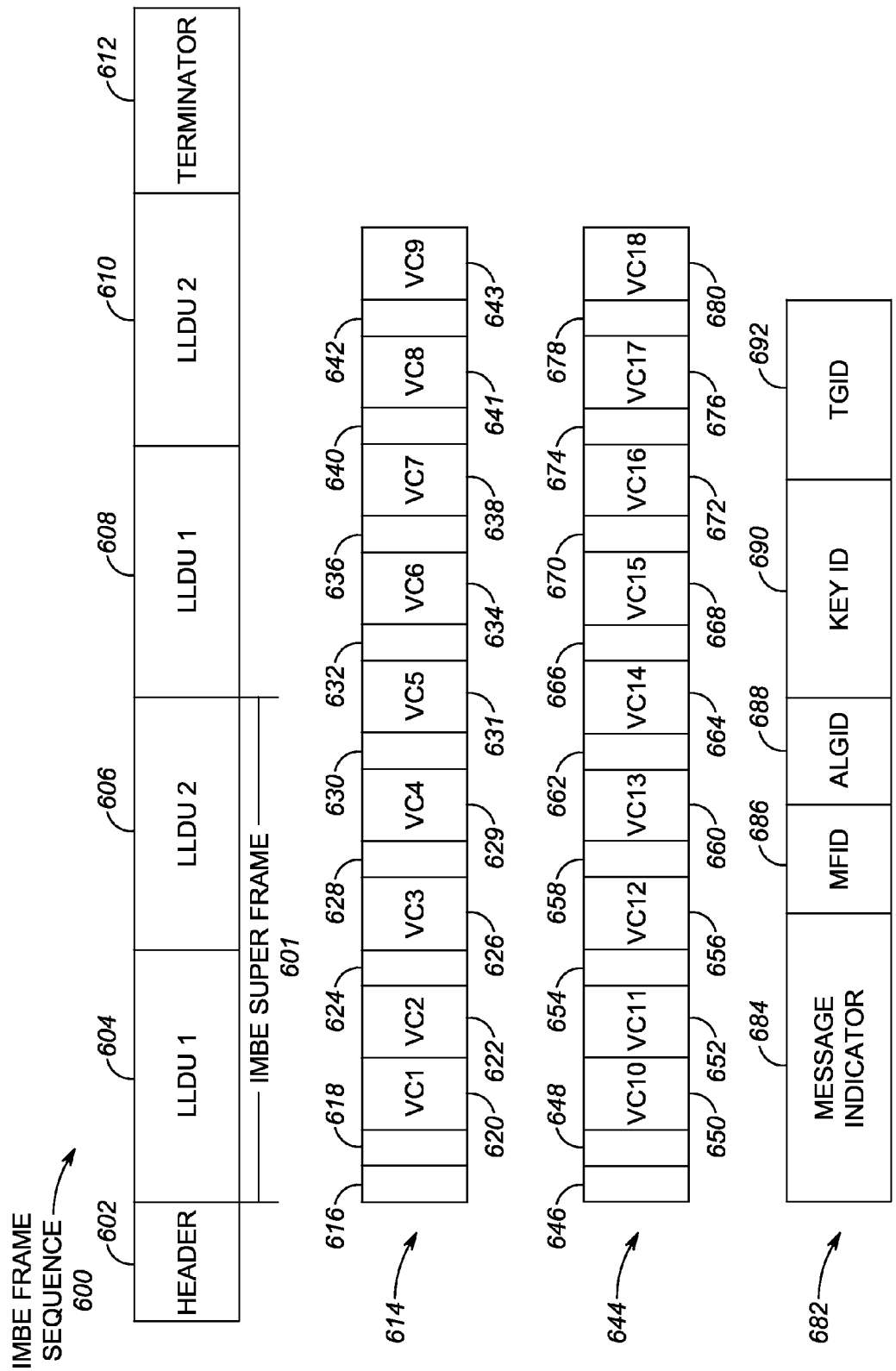

FIG. 6 is a block diagram of an IMBE speech encoding format in accordance with some embodiments. Encoding speech data according to an IMBE format may be implemented in an FDMA wireless networks. The IMBE voice encoding format 600 includes a voice frame sequence that includes a header frame 602, two logical link data unit 1 (LLDU1) frames (604, 606), two logical link data unit 2 (LLDU2) frames (608, 610), and a terminator frame 612. The IMBE frame sequence 600 that includes each LLDU1 and LLDU2 pair may also be called an IMBE superframe 601 and such a superframe has a length of 360 ms.

Referring to FIG. 6, an example header frame 682 includes a message indicator 684, a manufacturer identifier 686, algorithm identifier 688, key identifier 690, and a talk group identifier 692. The message indicator 684 is an initialization vector that is used in conjunction with the algorithm identifier 688 and the key identifier 690. The algorithm identifier 688 indicated the encryption algorithm (DES, RSA, etc.) used to encrypt the voice data (or in some embodiment that no encryption is being performed). The key identifier 690 indicates the encryption key used in conjunction with the encryption algorithm. Moreover, the TGID identifies the destination talkgroup for a voice message.

A transcoder uses the encryption information to decrypt the encoded speech data then transcode and transmit speech data to a destination subscriber unit. However, if the transcoder is in a late entry scenario, the transcoder may not receive the header 602. Thus, the transcoder may extract encryption information interspersed throughout the LLDU1 and LLDU1 frames and then decrypt the encrypted voice data to transcode the speech data from one voice format to another. In some embodiments, when the transcoder transcoder encryption speech data into IMBE format, the transcoder may generate and provide to the destination RF site or destination subscriber unit a header packet 602 including encryption parameters such as a message indicator, algorithm identifier, and encryption key identifier. The reception of the one or more header packets 602 allows a destination RF site or subscriber unit to decrypt the transcoded speech data.

Each IMBE superframe includes an Encryption Synchronization Signal (ESS) which is sent in the LLDU2 frame (606, 610). Specifically, the ESS includes 96 bits of information that includes encryption protocol identification information such as a message indicator (72 bits), algorithm identifier 8 bits, and an encryption key identifier 16 bits. Further, these 96 bits are expanded to 240 bits with an error correcting code.

LLDU 1 frame 614 includes nine voice code words, VC1-VC9 (620, 622, 626, 629, 631, 634, 638, 641, 643) as well as various control words (616, 618, 624, 630, 632, 636, 640, 642) interspersed within the LLDU 1 frame 614. Each voice code word spans 20 ms and is 144 bits in length. Further, the LLDU 1 frame 614 includes a frame synchronization (FS) signal 616 (48 bits) and a network identifier 618 (64 bits). In addition, six frames (624, 628, 630, 632, 636, 640) contain portions of the 240-bit link control word (each 40 bits in length). Moreover, the LLDU 1 frame 614 includes a portion of a Low Speed Data word in a frame 642 that is 32 bits in length.

LLDU 2 frame 644 includes nine voice code words, VC10-VC18 (650, 652, 656, 660, 664, 668, 672, 676, 680) as well as various control words (646, 648, 654, 658, 662, 666, 670, 678) interspersed within the LLDU 2 frame 644. Each voice code word spans 20 ms and is 144 bits in length. Further, the LLDU 2 frame 644 includes a frame synchronization (FS) signal 646 (48 bits) and a network identifier 648 (64 bits). In addition, six frames (654, 658, 662, 666, 670, 674) contain portions of the 240-bit ESS (each 40 bits in length). Moreover, the LLDU 2 frame 644 includes a portion of the Low Speed Data word in a frame 678 that is 32 bits in length.

When receiving speech data encoded in IMBE format, a transcoder decodes the received packets using an IMBE vocoder. Further, the transcoder extracts the protocol information from the ESS, where the ESS is transmitted in parts throughout the IMBE superframe as shown and described in FIG. 6. Alternatively, when transmitting speech date encoded in IMBE format, the transcoder provides the necessary encryption protocol identification information in the ESS (as well as in the voice header packets). That is, it provides the information in the ESS frames in LLDU2 (654, 658, 662, 666, 670, 674) frames including the algorithm identifier, key identifier, and message indicator.

Encoding and decoding speech data in IMBE format can be performed by the transcoder, subscriber units, and RF sites discussed in the pending disclosure.

Further embodiments include an article of manufacture including computer readable media with instructions encoded and stored thereon, the stored instructions, when executed causes a processor to perform the steps of receiving packets of a first communication session containing first encrypted speech data encoded according to a vocoder of a first type and encrypted using an encryption protocol. The received packets contain a first encryption protocol identification information distributed among the received packets. Further steps include extracting the first encryption protocol identification information from the received packets and processing the received packets based on the first encryption identification information. Processing the received packets may include decrypting encrypted speech data from at least some of the received packets to obtain the first vocoder speech data and encrypting second vocoder speech data according to a second encryption protocol information to obtain second encrypted speech data encoded according to a vocoder of a second type.

Additional steps includes transcoding first vocoder speech data to second vocoder speech data encoded according to a vocoder of a second type. Other steps include transmitting one or more voice header packets containing the second encryption protocol identification information in a second communication session and transmitting packets in the second communication session containing second encrypted speech data encoded according to a vocoder of the second type. The transmitted packets include the second encryption protocol identification information distributed among the transmitted packets. Moreover, the steps may include receiving a message from a controller device indicating that the received packets are capable of being encrypted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:

receiving packets of a first communication session after failing to first receive a header packet, due to late entry or channel noise, indicating whether the first communication session is encrypted or not encrypted;

making a determination, via one of a message received from a controller device and first encryption identification information extracted from a plurality of the received packets, of whether the first communication session includes encrypted speech data; and if the determination is that the first communication session does include encrypted speech data:

processing the received packets based on the first encryption identification information identifying a first encryption protocol used to encrypt first encrypted speech data of the first communication session encoded according to a vocoder of a first type to obtain first vocoder speech data;

transcoding the first vocoder speech data to second vocoder speech data encoded according to a vocoder of a second type;

encrypting the second vocoder speech data using a second encryption protocol to generate second encrypted speech data;

generating and transmitting one or more voice header packets containing a second encryption protocol identification information identifying the second encryption protocol in a second communication session; and subsequently transmitting packets in the second communication session containing the second encrypted speech data and including the second encryption protocol identification information distributed amongst the transmitted packets; and if the determination is that the first communication session does not include encrypted speech data:

transcoding first vocoder speech data from the received packets to second vocoder speech data encoded according to a vocoder of a second type; and subsequently transmitting packets in the second communication session containing the second vocoder speech data without generating and transmitting one or more voice header packets in the second communication session.

2. The method of claim 1, wherein processing the received packets includes decrypting encrypted speech data from at least some of the received packets to obtain the first vocoder speech data.

3. The method of claim 1, wherein the second encryption protocol identification information includes a second message indicator different than a first message indicator included in the first encryption protocol information, the second message indicator used to decrypt the second vocoder speech data by a subscriber unit.

4. The method of claim 1, wherein determining that the first communication session does include encrypted speech data comprises receiving the message from the controller device indicating that the plurality of received packets are encrypted.

5. The method of claim 1, wherein the vocoder of the first and second type is selected from the group consisting of Improved Multi-Band Excitation (IMBE) speech code, Advanced Multi-Band Excitation Full-Rate (AMBE FR) speech code and Advanced Multi-Band Excitation Half-Rate (AMBE HR) speech code.

6. The method of claim 5, wherein the first encryption protocol identification information is received in an Encryption Synchronization Signal (ESS).

7. The method of claim 1, further comprising failing to receive the header packet due to late-entry into the first communication session.

8. The method of claim 1, the method further comprising:
an Advanced Multi-Band Excitation Half-Rate (AMBE HR) vocoder encoding the second vocoder speech data in a wireless network implementing a time-division multiple access (TDMA) protocol such that the second vocoder speech data is transmitted in a voice frame sequence;
the AMBE HR vocoder encoding the second vocoder speech data in a repetitive voice frame sequence that includes a four 4V burst structure followed by a 2V burst structure; and
transmitting the one or more voice header packets including the second encryption protocol identification information and further including the second message indicator and an algorithm identifier and key identifier for the second encryption protocol;
wherein the 4V burst structure includes four voice frames carrying voice data and an encryption synchronization signal (ESS) B portion of the ESS carrying a portion of the second encryption protocol identification information; and
wherein the 2V burst structure includes two voice frames carrying voice data and an ESS A portion of the ESS carrying a portion of the second encryption protocol identification information.

9. The method of claim 1, the method further comprising:
an Improved Multi-Band Excitation (IMBE) vocoder encoding the second vocoder speech data in a wireless network implementing a frequency division multiple access (FDMA) protocol such that the second vocoder speech data is transmitted in a voice frame sequence;
the IMBE vocoder encoding the second vocoder speech data in a repetitive voice frame sequence that includes 18 voice frames transmitted in 360 milliseconds and an encryption synchronization signal (ESS) carrying the first encryption protocol identification information;
transmitting the one or more voice header packets including the second encryption protocol identification information and further including the second message indicator and an algorithm identifier and key identifier for the second encryption protocol.

10. The method of claim 1, wherein making the determination that the first communication session does include encrypted speech data comprises receiving the message from the controller device, the message indicating that a given channel assignment or channel type is capable of carrying encrypted data.

11. A transcoding device, comprising:
a transceiver;
a memory; and
one or more processors configured to:
receive, via the transceiver, packets of a first communication session after failing to receive a header packet, due to late entry or channel noise, indicating whether the first communication session is encrypted or not encrypted;
making a determination, via one of a message received from a controller device and first encryption identification information extracted from a plurality of the received packets, of whether the first communication session includes encrypted speech data; and
if the determination is that the first communication session does include encrypted speech data:
process the received packets based on the first encryption identification information identifying a first encryption protocol used to encrypt first encrypted speech data of the first communication session encoded according to a vocoder of a first type to obtain first vocoder speech data;
transcode the first vocoder speech data to second vocoder speech data encoded according to a vocoder of a second type;
encrypt the second vocoder speech data using a second encryption protocol to generate second encrypted speech data;
generate and transmit, via the transceiver, one or more voice header packets containing a second encryption protocol identification information identifying the second encryption protocol in a second communication session; and,
subsequently transmit, via the transceiver, packets in the second communication session containing the second encrypted speech data and including the second encryption protocol identification information distributed amongst the transmitted packets; and
if the determination is that the first communication session does not include encrypted speech data:
transcode first vocoder speech data from the received packets to second vocoder speech data encoded according to a vocoder of a second type; and
subsequently transmit packets in the second communication session containing the second vocoder speech data without generating and transmitting one or more voice header packets in the second communication session.

12. The device of claim 11, wherein processing the received packets includes decrypting encrypted speech data from at least some of the received packets to obtain the first vocoder speech data.

13. The device of claim 11, wherein the one or more processors are further configured to determine that the first communication session does include encrypted speech data at least in part by receipt of the message from the controller device indicating that the received packets are encrypted.

14. The device of claim 11, wherein the one or more processors are further configured to make the determination that the first communication session does include encrypted speech data at least in part by receipt of the message from the controller device, the message indicating that a given channel assignment or channel type is capable of carrying encrypted data.

15. A non-transitory computer readable storage medium with instructions encoded and stored thereon, the stored instructions, when executed causes a processor to perform the steps of:

receiving packets of a first communication session after failing to receive a header packet, due to late entry or channel noise, indicating whether the first communication session is encrypted or not encrypted;

making a determination, via one of a message received from a controller device and first encryption identification information extracted from a plurality of the received packets, of whether the first communication session includes encrypted speech data; and rif the determination is that the first communication session does include encrypted speech data:

processing the received packets based on the first encryption identification information identifying a first encryption protocol used to encrypt first encrypted speech data of the first communication session encoded according to a vocoder of a first type to obtain first vocoder speech data;

transcoding the first vocoder speech data to second vocoder speech data encoded according to a vocoder of a second type;

encrypting the second vocoder speech data using a second encryption protocol to generate second encrypted speech data;

generating and transmitting one or more voice header packets containing a second encryption protocol identification information identifying the second encryption protocol in a second communication session; and, subsequently transmitting packets in the second communication session containing the second encrypted speech data and including the second encryption protocol identification information distributed amongst the transmitted packets; and if the determination is that the first communication session does not include encrypted speech data:

transcoding first vocoder speech data from the received packets to second vocoder speech data encoded according to a vocoder of a second type; and subsequently transmitting packets in the second communication session containing the second vocoder speech data without generating and transmitting one or more voice header packets in the second communication session.

\* \* \* \* \*